Sept. 15, 1970   M. R. KRUPSKY   3,528,657
SUSPENSION SEAT TOY AND JUVENILE REST FURNITURE
Filed Sept. 21, 1967   8 Sheets-Sheet 1
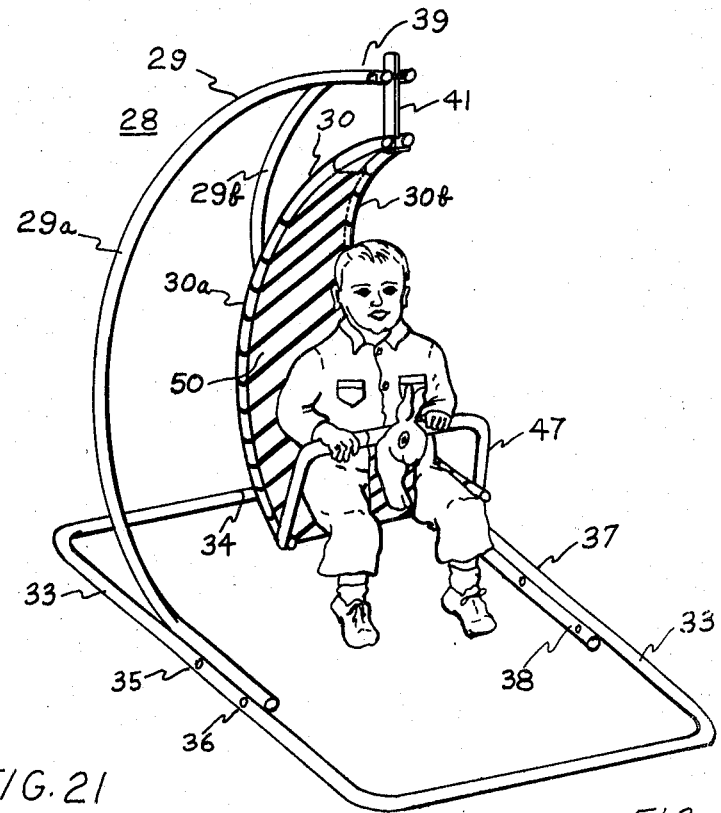
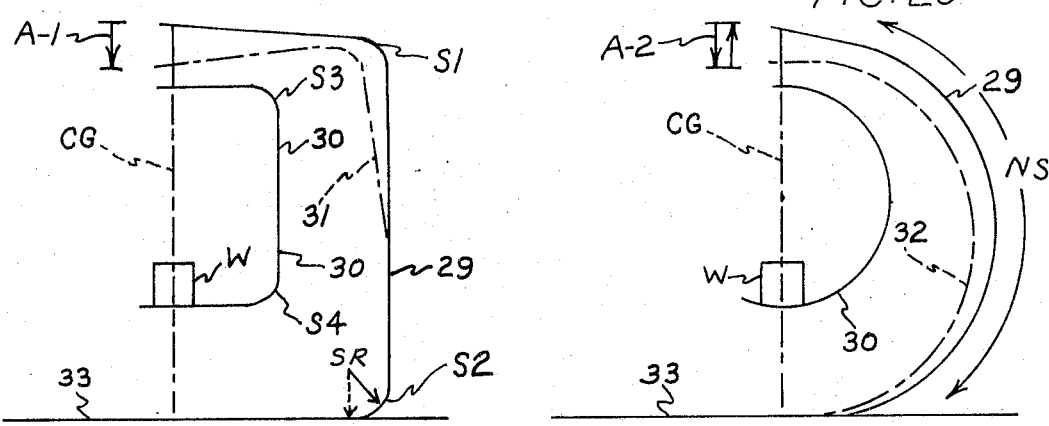
INVENTOR.
Michael R. Krupsky

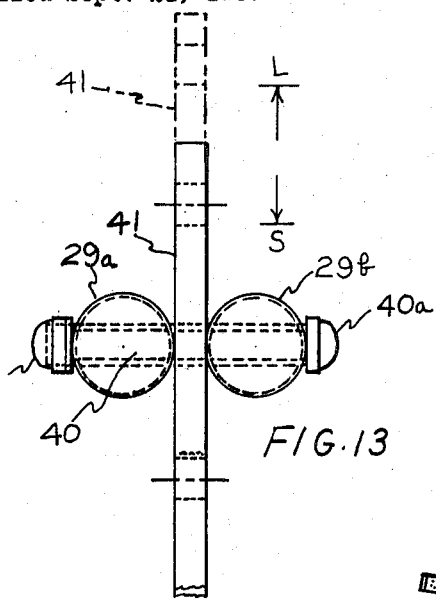
FIG. 13
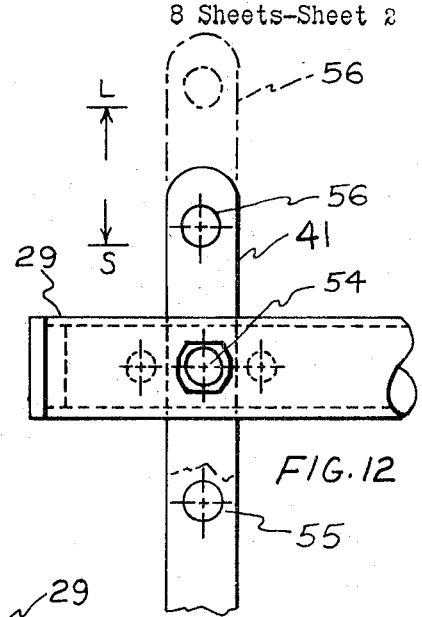
FIG. 12
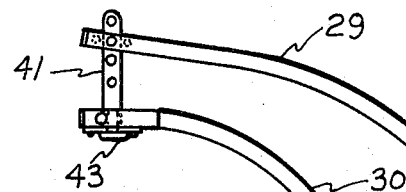
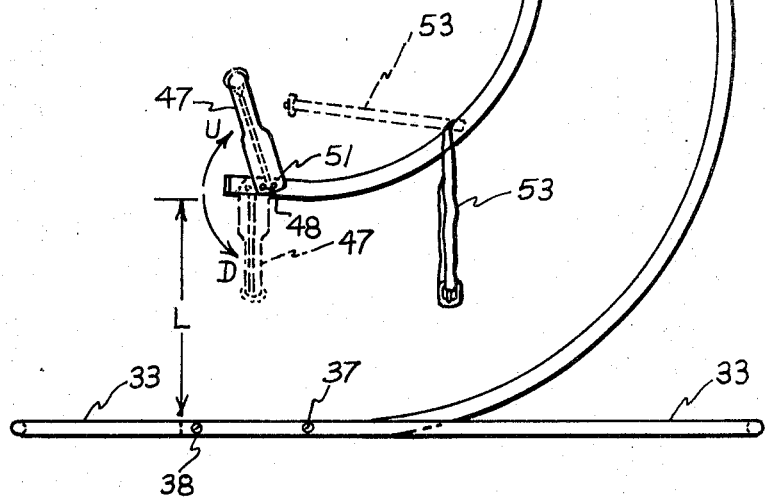
FIG. 2

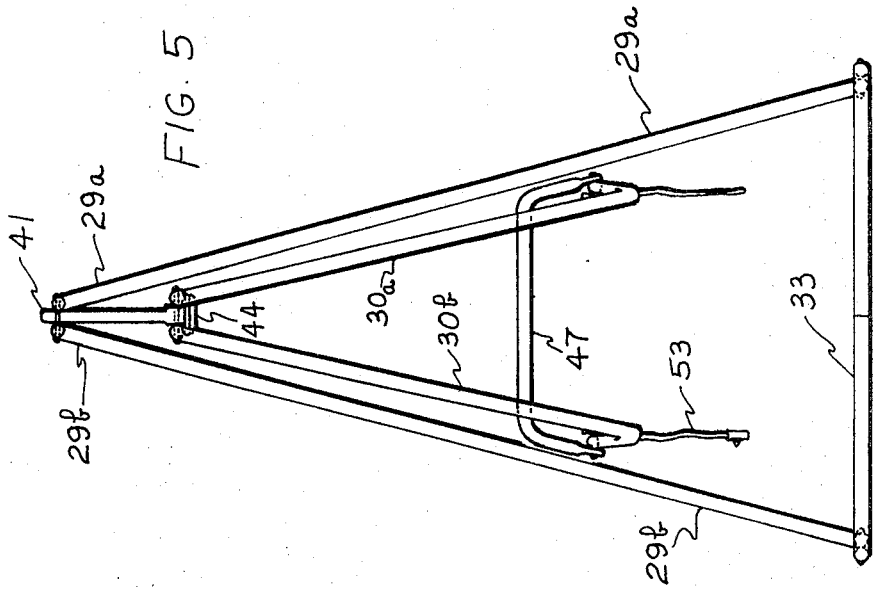
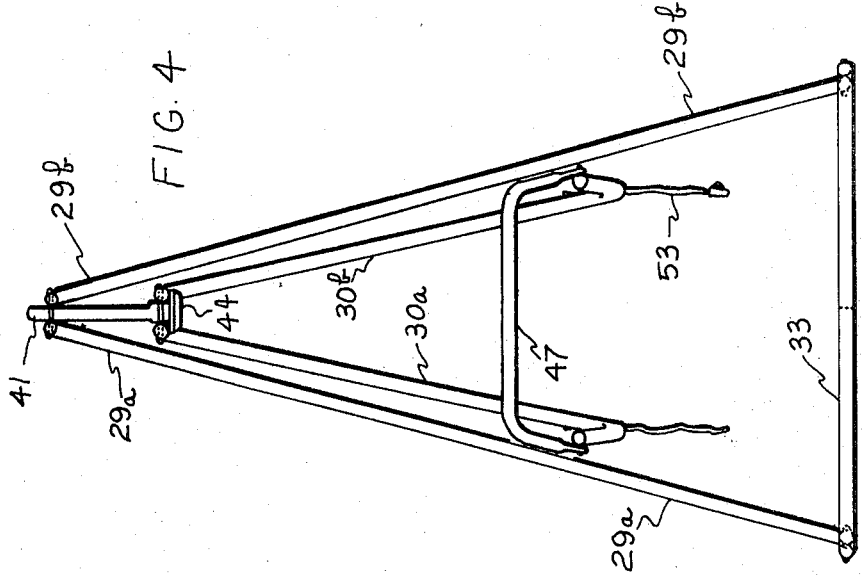

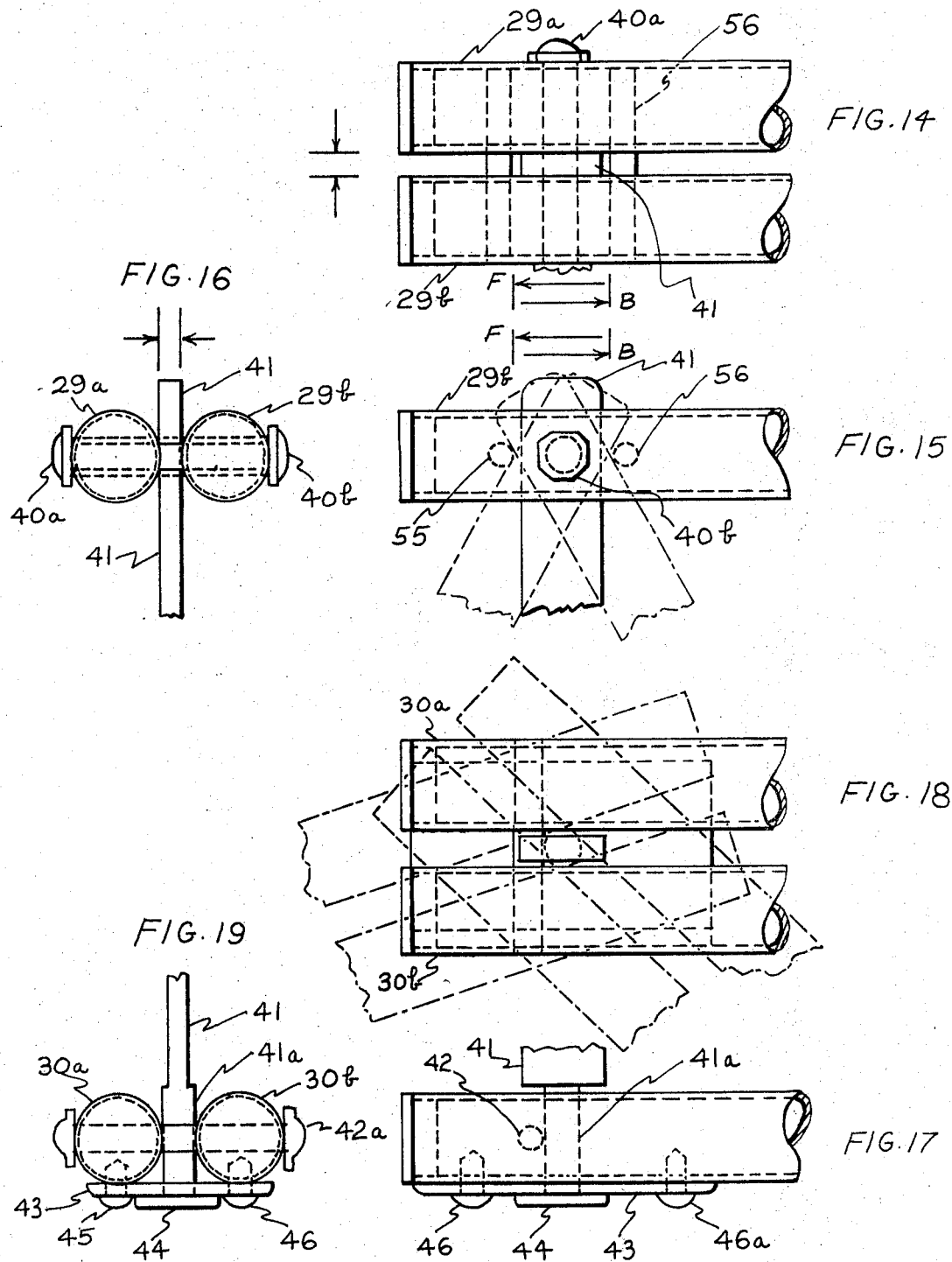

INVENTOR.
Michael R. Krupsky

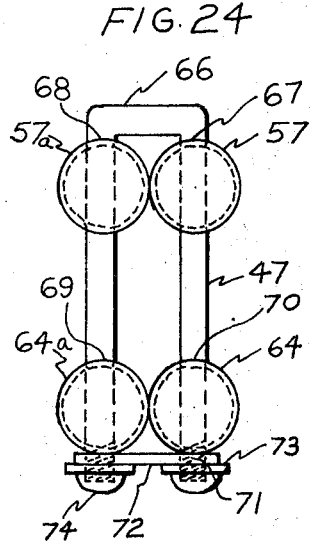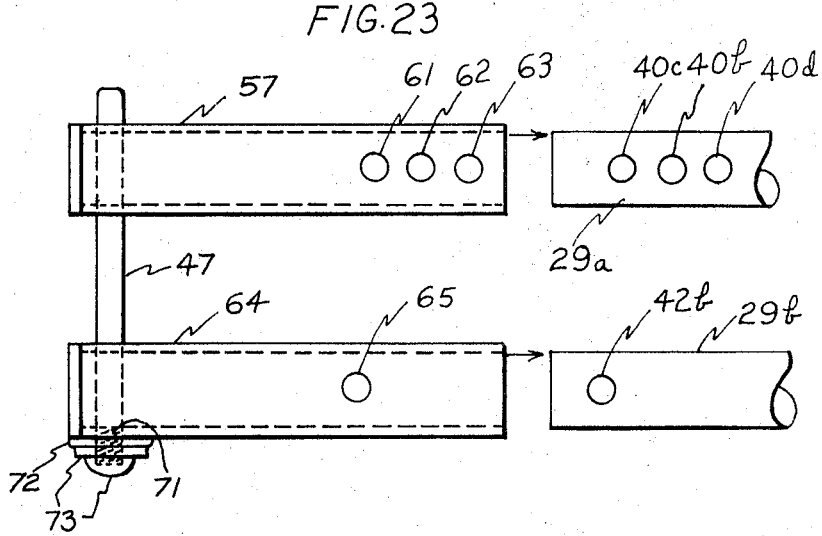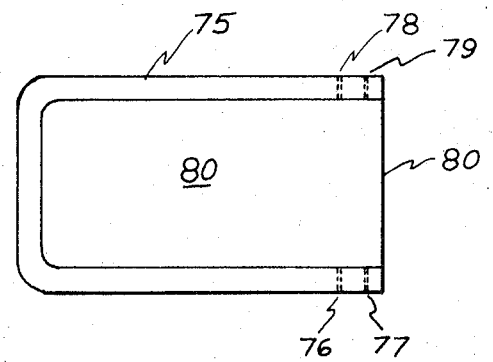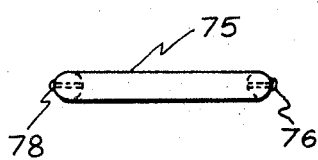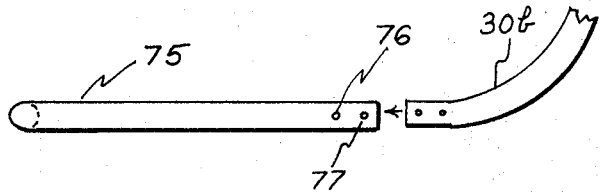

United States Patent Office 3,528,657
Patented Sept. 15, 1970

3,528,657
SUSPENSION SEAT TOY AND JUVENILE REST FURNITURE
Michael R. Krupsky, East Orange, N.J., assignor to Richard Quelch, Berkeley Heights, Roswell W. Bonnell, Bloomfield, and Saul Berry, Clifton, N.J.
Filed Sept. 21, 1967, Ser. No. 669,453
Int. Cl. A63g 9/00
U.S. Cl. 272—85
10 Claims

ABSTRACT OF THE DISCLOSURE

A collapsible suspension seat toy with the seat suspended for rotation and oscillation from a pivotal point at the top ends of two arcuate members removably anchored at their bottom ends to opposite sides of a frame to rest on the floor and having an area whose contour is beyond the trace of a gravity line from the oscillating seat in any position, to assure stability for the toy in all positions of the seat.

---

This invention relates to the amusement toy and rest furniture arts. More particularly it relates to an apparatus for children to play in with a swinging, rotating, rocking, and vertically bouncing motion within a specifically designated and confined area and it also relates to a rest apparatus for children.

It is to be emphasized that this is a suspension apparatus having a seat portion suspended from, and acting with a support stand as an integrated unit in a unique manner. In fact, the suspended seat, the support for the suspended seat, and the joining means between the seat and the support all have unique features within themselves. However, in this invention the three major components, the seat, the support, and the joining means, are all combined to act in combination to achieve their end result of a safe amusement and rest apparatus, and the overall combination is the most significant feature of this invention.

As a result of the design features and consideration of the physics involved in this invention, a remarkably safe and amusing toy and rest apparatus for children is achieved.

In conventional toys no one apparatus provides all of the aforesaid motions through one unit. As provided herein, the multiple motions of the apparatus are provided in a safe and economically practical unit.

With the foregoing in mind, it is therefore the principal object of my invention to provide an amusement toy which is placed into action by the body movements of its occupant and which will have three dimensional movements: namely, in an orbit about a point of suspension; pivotally about an axis at a point of suspension; and vertically reciprocable on a point of suspension. Some amusement apparati provide one, two or three dimensional movement, but said dimensional movements when applied as three dimensions, are restricted by design in a manner which limits the action of any singular apparatus, so that quasi-dimensional movement is achieved. That is, no one conventional apparatus provides all of the completely distinct directional actions that this invention provides.

A second object of this invention is to provide a suspension seat device embodying a combination of co-operating means to confine the aforesaid distinct directional actions in a safe manner.

A third object of this invention is to provide a suspension seat device having a novel support stand to suspend a seat portion from a single point on the support, wherein said support stand provides a means which allows three dimensional movement and several directional actions distinct from one another of the suspended seat.

A fourth object of this invention is to provide a suspension seat device having a novel support stand that confines the dimensionally distinct actions of the suspended seat portion within a designated area, without restricting the operation of the complete apparatus, in order to render a safe amusement apparatus and to make the unit a compact consumer item.

A fifth object of this invention is to provide a suspension seat device having a novel support stand and seat that can be manufactured economically, that is, the support stand and seat, by virtue of their mechanical design provide the functional and physical strength and rigidity to take all of the strains and stresses involved in the action of the apparatus without using cumbersome and expensive material, that would entail costly production expense.

A sixth object of this invention is to provide a suspension seat device having a unique mechanical and functional relationship between a seat portion suspended from one point on a support stand, wherein the relationship enables a multiplicity of physical actions for an amusement toy and also provides substantial safety factors resulting from the use of the principles of physics in the design and relationship of the components of the apparatus.

A seventh object of this invention is to provide a suspension seat device having a novel connection for suspensional coupling a seat portion to a support stand, in order to allow three-dimensional, directed, and safe action of a toy with a side latitude of movement within a safe confined area.

An eighth object of this invention is to provide a suspension seat device having a connection means between a suspended seat portion and a support stand which allows for vertical adjustment of the seat portion, with relationship to the support stand, in order to accommodate children of varying ages, heights, and weights, without interfering with the safe action provided by the apparatus A ninth object of this invention is to provide a suspenson seat toy having a support stand, for a suspendable seat portion, that will not substantialy move from a seleted position on a plane locaton surface when the apparatus is placed in action.

A tenth object of this invention is to provide a suspension seat device having a support stand for a suspendable seat portion having natural and design resiliency, in order that the child user will not be physically shaken or jarred while the apparatus is in action.

An eleventh object of this invention is to provide a suspension seat device having a support stand for a suspendable seat portion that will enable the apparatus to lie with stability adjacent to a plane surface, whether indoors or outdoors, provided the plane surface is reasonably free of very obtrusive objects.

A twelfth object of this invention is to provide a suspension seat device having a support stand for a suspendable seat portion that will not mar or nick the finish of a household floor.

A thirteenth object of this invention is to provide an apparatus for amusement having no obstructions upon which a child can bump or hit his head, back, arms, and legs, etc., while bouncing, swinging, rocking, and rotating in this apparatus.

A fourteenth object of this invention is to provide an amusement apparatus which can be converted into an item of juvenile rest furniture.

A fifteenth object of this invention is to provide an item of juvenile rest furniture upon which a child may sit or lie prone.

In accordance with the invention, a supporting base and stand provide support for a movable swing seat frame. The supporting base defines an area which will always enclose a gravity line from the center of gravity of a child in the swing seat in any position the child and the seat will assume in action.

A feature of the invention is the use of metal tubing for the stand, curved substantially, in semi-circular form to provide inherent resiliency to the device as a mechanical structure while at the same time embodying an engineering design permitting most economical formation in manufacture of the device.

The construction is more fully described in the following specification, in connection with the accompanying drawings, in which FIG. 1 is a perspective view of a suspension seat device of this invention with a child placed therein;

FIG. 2 is a side view of the device of FIG. 1;

FIG. 4 is a front view of the seat device;

FIG. 5 is a rear view of the seat device;

FIG. 12 is a side elevational view of the top portion of the suspension assembly of the support stands as seen in FIGS. 2, 10 and 11;

FIG. 13 is a front elevational view of FIG. 12.

FIG. 14 is a top elevational view of the top portion of the suspension assembly of the support stand as seen in FIGS. 2, 12, and 13 showing the mechanical control of the swing movement of the suspended seat portion;

FIG. 15 is a side elevational view of the top portion of the suspension as shown in FIG. 14 to further illustrate the control of the swing movement of the suspended seat portion;

FIG. 16 is a front end elevational view of FIGS. 14 and 15.

FIG. 17 is a side elevational view of the bottom portion of the suspension assembly to support the seat member of this invention;

FIG. 18 is a top elevational view of FIG. 17 illustrating the action and control of the rotatable feature of this invention.

FIG. 19 is a front end elevational view of FIG. 17 further illustrating the confinement of the rotation of the seat member and the construction of the suspension means.

FIG. 20 is a schematic graph in side view of this invention illustrating the inherent resiliency of the device as a mechanical structure;

FIG. 21 is a schematic graph in side view for comparison with FIG. 20 to illustrate how the resiliency and mechanical structure is affected when a change is made in this invention, to employ corner bends instead of a regular arc as in FIG. 20;

FIG. 23 is a side elevational view of the top extension member illustrating the conversion of the amusement toy to an apparatus for the resting of an individual;

FIG. 24 is a front end elevational view of FIG. 23;

FIG. 25 is a side elevational view of the bottom extension member illustrating the conversion of the amusement toy to an apparatus for the resting of an individual;

FIG. 26 is a front elevational view of FIG. 25;

FIG. 27 is a top view of the extension member of FIGS. 25 and 26.

Similar reference characters refer to similar parts throughout the several views of the drawing.

Having reference now to FIG. 1, there is generally indicated by the number 28 an apparatus consisting of a support stand 29 and a suspension seat 30. The support stand 29 and the suspension seat 30 are constructed of tubular metal material and the stand 29 and seat 30 are bent in a generally semi-circular curve. The semi-circular curve of the metal tubing is most significant in that any other type of bend in solid or tubular material will not provide the unique characteristics of flexibility inherent in this invention. That is, the generally semi-circular curved bend along the full length of the tubular material principally provides the maximum strength available with the material when the material is used in the manner of this invention. Any other type of bend in the tubular material, not generally semi-circular, will weaken the tubular material in the region of the bend.

For example, reference to FIG. 21 shows the effect of bending the tubing with small radius bends SR in the order of three inches to twelve inches radius. The stress points S1 and S2 on the stand will become breakable or distortable weak points when weight W is placed upon the seat portion 30 of the invention, since those full bends SR have been made beyond the elastic limit of the tubing. In addition, stress points S3 and S4 on the seat portion will also become weak points, subject to breaking and distortion of the seat.

Referring now to FIG. 20 which shows the present design concept, it can be seen that there is no significantly distinct stress point, over the region illustrated by the arrow NS, which has any substantial consequence because the smooth semi-circular curve placed within the tubular material allows the full length of the tubing in the stand 29 and the seat 30 to absorb and distribute the stresses NS set up within the tubular material when a weight W is placed upon the seat. Secondly, the generally semi-circular curve along the full length of the tube allows for the natural spring or resiliency of the tubing to act as an action factor in the apparatus when such a stand 29 is provided.

Referring again to FIGS. 20 and 21, it can be seen that the actions A-1 in FIG. 21, and A-2 denoted by arrows in FIGS. 27 and 28, in FIG. 20 will be completely different in that action A-1 will either be a static action of the tubing being permanently placed in a downward position line 31, or the natural springing action of the tube will be greatly minimized in FIG. 21 as compared to the springing action A-2 and movement of the stand 29, seen in line 32, in FIG. 20.

Another significant reason for making the curves in the seat and in the stand generally semi-circular is that most important balancing and action features are achieved with a semi-circular curve rather than with any other type of bends in the tubular material. The balancing and action features provided by the semi-circular curves in the tubing will be herein later described in detail.

Figure 3:
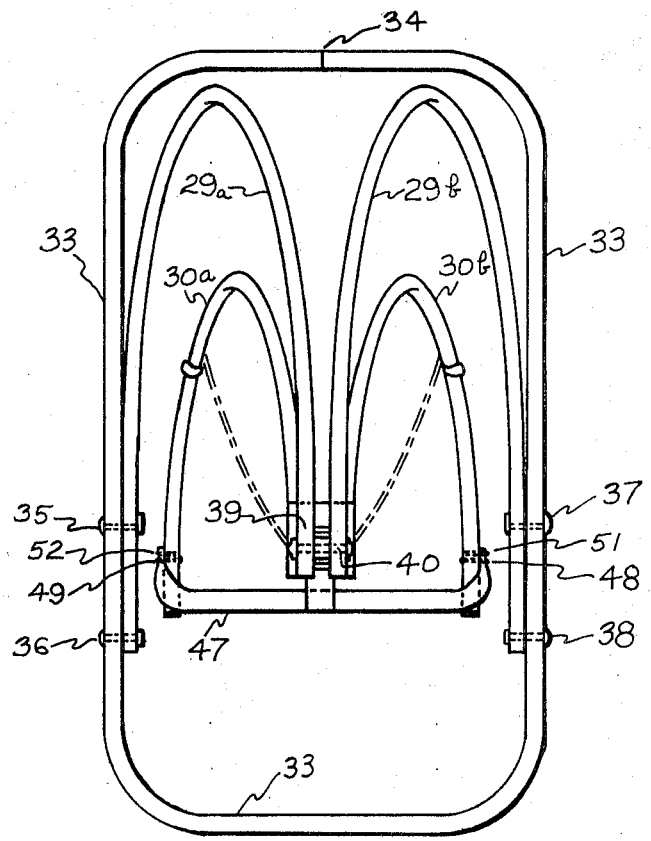
FIG. 3 is a top view of the seat device shown in FIG. 2.
Figure 11:
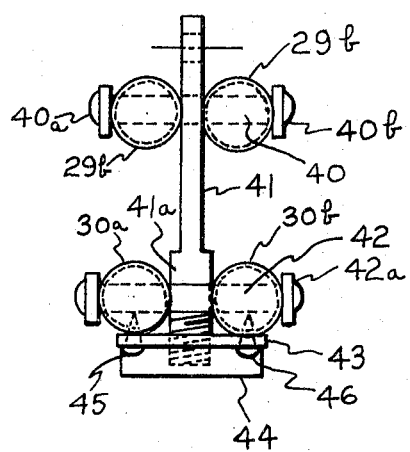
FIG. 11 is a front view of the suspension assembly shown in FIG. 10.
Figure 10:
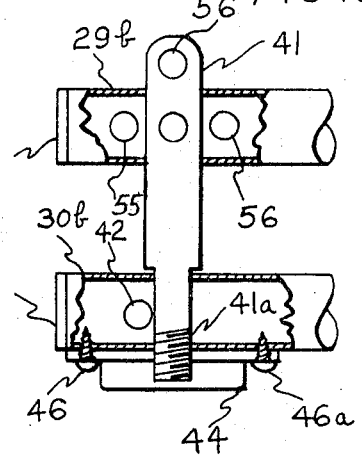
FIG. 10 is a side elevational view of the complete suspension assembly.

Referring now specifically to FIGS. 1, 2, 3, 10, and 11, it will be seen that the stand 29 of the apparatus consists of two metal tubular stand elements 29a and 29b, exactly corresponding in curve and length to one another. The two stand elements 29a and 29b are bolted at their bottom ends to a base support 33 also made of tubular metal. The base support 33, as best seen in FIG. 3, is preferably formed from one piece of tubing into a rectangular shape. The two ends of the base support 33 are joined, preferably welded, at a suitable point such as at rear mid-point 34. In use, the base support 33 lies on a planar surface such as a dwelling floor, or when outdoors, on the ground.

The support stand 29 is bolted or fastened in any suitable manner, such as at points 35, 36, 37, and 38, to the base support 33. From the fastening points 35, 36, 37, 38, the two stand members 29a and 29b converge to an elevated joining region 39. At joining region 39 a bolt 40 is passed through holes in the upper ends of the two stand members 29a and 29b. Prior to joining the stand members 29a and 29b, a metal suspension bar 41, having several holes drilled therein to accommodate the bolt 40, is placed in between the members 29a and 29b. When the suspension bar 41 is placed between the two stand members 29a and 29b, the bolt 40 is then passed through a selected hole in the stand 29b member through a hole in the suspension bar 41 and then through stand member 29a and fastened with a cap screw or other type nut.

The suspension bar 41 then has fixed to it, at its lower end, the seat portion 30. The seat portion 30 consists of two metal tubular members 30a and 30b each bent to form a generally semi-circular curve. The two members 30a and 30b are joined together at the lower part of the suspension bar 41 by a suitable fastening device, such as a bolt 42 in the same manner as bolt 40 joins the two members 29a and 29b.

The two members of seat portion 30 are also joined together at their uppermost ends by a base plate 43 (FIGS. 10 and 11), generally made of a flat piece of metal stock, which is secured to each tubular member 30a and 30b of the seat portion 30 of the apparatus 28.

The lower end of the rectangular suspension bar 41 is formed as a found rod 41a which is threaded to allow a suitable nut 44 to be tightened upon the end of the suspension bar 41. When the two upper ends of the seat members 30a and 30b are rigidly joined by bolt and nut device 44, and base plate 43 with screws 45 and 46, the round rod portion 41a of the suspension bar 41 is inserted through a suitable hole in the base plate 43 and the nut 44 is turned onto the threaded end of the rod portion 41a of the suspension bar 41. The fastening in the manner just described provides for the suspension of the seat portion 30 from the support stand 29. The metal tube members 30a and 30b and the base plate 43 rest and ride on the nut 44.

The upper portions of the seat members 30a and 30b extend downward from their joining region at the lower end of the suspension rod 41, in a diverging manner to a cross-over handlebar member 47. The crossover handlebar member 47 is made of tubular metal and is formed in a wide U-shaped manner. At each end of the legs of the U-shaped handlebar member 47 are positioned holes 48 and 49 best seen in FIGS. 2 and 3. Through holes 48 and 49 a bolt is placed through a corresponding hole in the bottom end of each of the seat members 30a and 30b. Cap screw nuts, or any conventional nuts are then placed upon the bolts in holes 48 and 49 and thus the handlebar crossover member 47 is rigidly secured to the side seat members 30a and 30b, thus spreading and holding apart the members 30a and 30b in order to accommodate the frontal width of a child.

The framework of the seat portion, which is formed from side members 30a and 30b and the connecting crossover handlebar 47, has placed upon it a canvas or other suitable covering material 50, seen only in FIG. 1, which enables the child to sit between the side members 30a and 30b. The covering material 50 is simply sewn or fastened by suitable clips or any conventional means around the side members 30a and 30b.

The child seated in the seat 30, as seen in FIG. 1, is placed between the two members 30a and 30b onto the canvas cover 50. If desired, the crossover handlebar 47 may be first moved from the up position "U" seen in FIG. 2, to the down position "D". To permit this, the cross bar member 47 is pivoted on bolts 48 and 49 at the end of each arm of the U-shaped cross bar member 47.

In order to prevent the handlebar crossover member 47 from falling to a down position when the child is using the apparatus two holes 51 and 52 placed in the cross member 47 line up with two corresponding holes in the side seat members 30a and 30b and a pin is inserted through each side arm of the cross member 47 and each seat member. Thus the cross member is anchored at two points 51 and 52 on each of its ends and is prevented from being casually moved, and only where intended.

In FIG. 2 there can be seen a common belt and buckle 53 of leather or fabric in order to secure the child in the seat. However, the belt is merely a psychological safeguard and is not really necessary because of the safety factors now herein to be described that are inherent in the design and construction of the apparatus.

Figure 6:
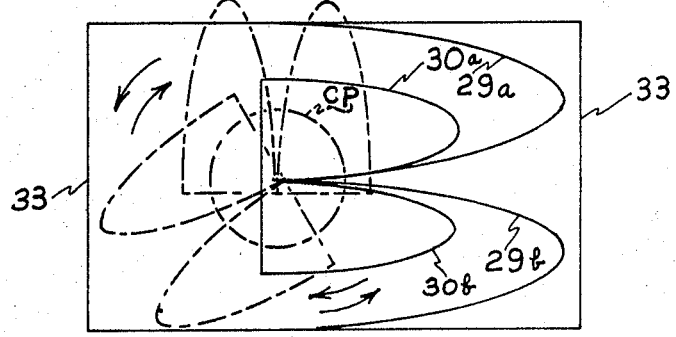
FIG. 6 is a schematic top view of the seat device illustrating the rotatable action feature as herein described.

Referring now to FIGS. 1, 6, 7, 8 and 9 it can be seen from the schematic drawings representing the dynamics, or movement of the apparatus 28, that at no time does the gravity line from the center of gravity of the seat portion 30 ever move outside the area of the base support 33. In FIG. 6, a schematic top view of the apparatus, the circle CP designates the limit of the center of gravity line of the child's position, or weight, when the seat portion 30 is revolved about the axis point of the lower end 41a of the suspension bar 41. The seat portion can rotate in either direction, as seen by the direction arrows full circle or in a 360° and the seat will not leave the confines of the base support 33.

Figure 7:
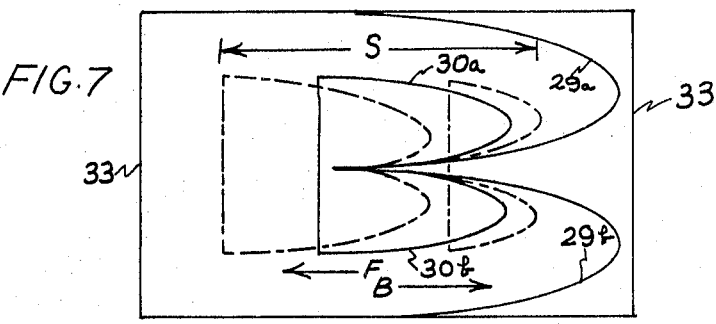
FIG. 7 is a schematic top view of this invention illustrating the horizontal swinging action feature as herein described.

Referring now to FIG. 7, it can be seen that for the full back and forth swinging action of the seat portion the gravity line of the center of gravity stays within the area of the base support 33. The seat portion can only swing forward and backward in the direction of the arrows F and B, and only within the distance designated by the arrow S. The method by which the swing movement of the seat is restricted will be explained in detail when the suspension means, as seen in FIGS. 10 through 19, is described.

Figure 8:
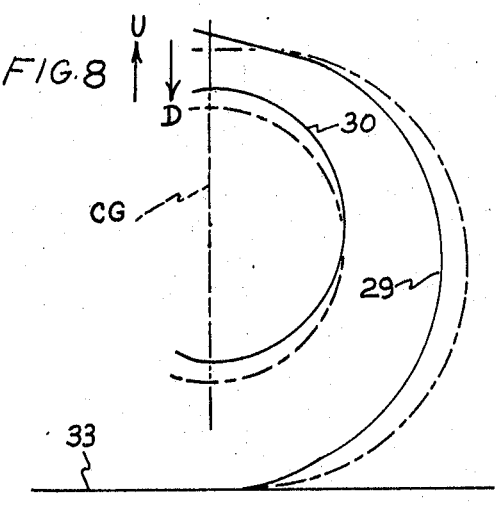
FIG. 8 is a schematic side view of this invention illustrating the vertical bouncing action feature as herein described.

Referring now to FIG. 8 the possible vertical reciprocating action of the apparatus is indicated by the arrows "U" and "D." Here again, the seat portion gravity line is confined to the area designated by the base support 33, the seat portion 30, and the support stand 29, as shown by the center of gravity line CG.

Figure 9:
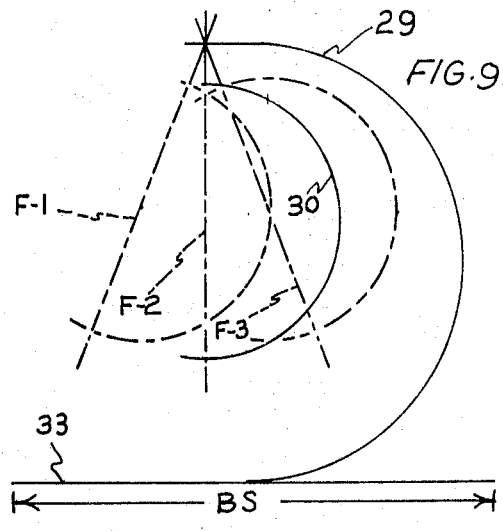
FIG. 9 is a schematic side view of this invention further illustrating the horizontal swing action feature as herein described.

In FIG. 9 the swinging action of the seat 30, as previously indicated in FIG. 7, is again shown, schematically in order to show that at no time does the support stand 29 shift or rock the stand 29 or base 33, as the seat is in a swinging action. This prevention of shifting of the stand 29 is provided for by utilizing the semi-circular curve in the stand to also designate a confining area of swing of the seat in that the weight of the child and the resultant gravity pull acts as a stabilizer on the stand. Thus, the weight of the child helps to stabilize the stand on the floor or other place of support surface. The lines F-1, F-2 and F-3 represent force lines of the seat portion with a child therein as the seat swings from one extreme F-1 to the other extreme F-3. However, the vertical gravity lines from the seat portion always stay between the two end points of the baseline BS which represents the length of the base support 33.

Referring now to FIGS. 12 and 13, the suspension means between the stand 29 and the seat 30 is seen in detail. FIG. 13 is a front view, and shows the suspension bar 41 fitted snugly between the two metal tubular members 29a and 29b, with the bolt 40 inserted through appropriate selected holes in the tubular members and in the suspension bar. When the cap screw nut 40a is tightened upon the bolt 40, the pivoted suspension bar 41 is free to move in only one plane, in a back and forth straight line direction parallel to S as shown in FIG. 7. The suspension bar 41 is free to swing on the bolt 40 because of the hole 54 in the suspension bar 41 that the bolt fits through.

In FIGS. 14, 15, and 16 the action of the suspension bar 41 as just described is depicted. The suspension bar 41 can oscillate on the bolt 40 in a limited angle, because two cylindrical pins 55 and 56 are placed on either side of the suspension bar 41 through appropriate holes in the tubes 29a and 29b, to stop the oscillation of the suspension bar. The bar can oscillate from position F to position B as seen by the arrows; thus the degree of swing of the seat as seen in FIGS. 7 and 9 is controlled.

Referring back to FIGS. 10 and 11, the suspension bar 41 extends from the tubes 29a and 29b to the tubes 30a and 30b. As earlier described, the suspension bar is a rectangular bar stock at its upper end and is a round cylindrical rod at its lower end portion 41a. The tubes 30a and 30b are on each side of the round rod portion 41a, and a bolt 42 is then placed through appropriate holes in the tubes 30a and 30b, but not through any hole in the round rod portion 41a of the suspension bar 41. The bolt 42 lies adjacent and in front of the round rod portion 41a of the suspension bar. The purpose of the bolt 42 is to draw together the tubes 30a and 30b against the round rod portion 41a of the suspension bar 41. The bolt 42 further serves to prevent the tubes 30a and 30b from pulling apart and away from the portion 41a of the suspension bar.

A metal base plate 43 is screwed onto the bottoms of the tubes 30a and 30b in order to further hold the tubes together and also to enable the seat portion to rest upon the nut-like head plate 44 which is fastened to a threaded portion of the round rod portion 41a of the suspension bar.

Referring now to FIGS. 6, 10, 17, 18, and 19 the rotating action, in a full 360° circular pattern, of the seat 30 can be seen. The tubes 30a and 30b rotate about the round rod portion 41a of the suspension bar 41. The bolt 42 prevents the tubes from sliding away the rod portion 41a when weight is placed in the seat 30. The base plate 43 enables the nut-like cap 44 to hold the seat to the suspension bar 41 when weight is placed in the seat. Thus the controlled rotatable action, as depicted in FIG. 6 is achieved.

Referring back to FIGS. 12 and 13, the top portion of the suspension bar 41 of the support stand 29 is depicted to show an adjustable feature of the apparatus 28. A series of holes such as holes 54, 55, and 56 placed in the rectangular bar portion of the suspension bar 41 allows for the lifting of the seat 30 to accommodate children of different ages. That is, as a child grows older the length of the child's legs become longer, the distance (arrow L, seen in FIG. 2), is made longer by lifting the seat closer to the top of the support stand. The lifting of the seat is simply accomplished by removing the bolt 40 from the suspension bar 41 and tubes 29a and 29b and then insert the bolt into a lower hole 55 in the suspension bar 41. (Thus, the seat is lifted from point S to point L as seen by the arrow.)

Figure 22:
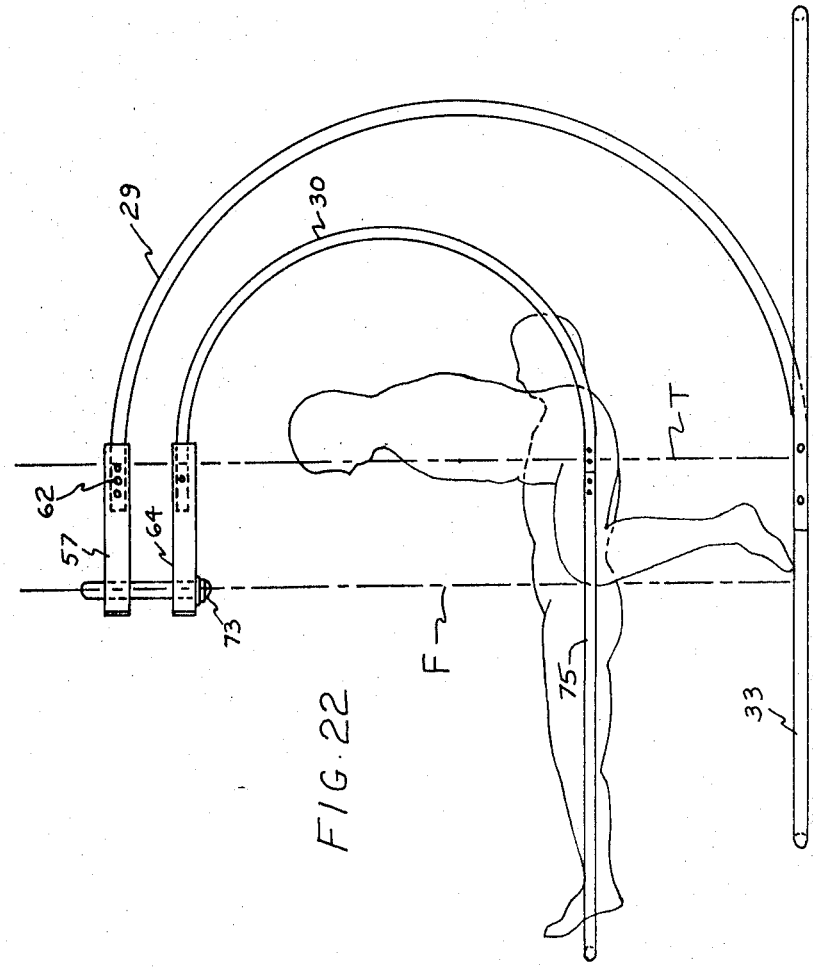
FIG. 22 is a schematic side view of this invention illustrating how the apparatus is applied as a resting apparatus for an individual.

Referring now to FIG. 22, there is shown a modification of the apparatus 28, whereby the suspension seat and support stand are converted to a juvenile furniture apparatus for a child to rest in. The significant aspect of the resting apparatus is the changing of the balance point or the gravity center line, from toy position T to the juvenile furniture position F. By extending the upper end portion 57 of the tubular members 29a and 29b and also extending the upper end portion 58 of the tubular members 30a and 30b, the seat portion 30 accommodates a body to sit or lie prone in the seat portion 30. An extension 59 is also provided at the lower end of the seat portion in order to accomplish the change from a sitting toy to a juvenile furniture apparatus to accommodate an individual in a prone position. The extension means 57, 58, and 59 are described in FIGS. 23 to 27.

The necessity of shifting the suspension point on the apparatus 28 from S-1 to S-2 occurs because as the mass of the child is shifted, from the sitting position SP to the prone position PP, the center of gravity line of the mass of the child is generally shifted from point T to point F. Thus, by a unique application of bending tubular material in a proper curve and the relationship of the several curves to one another with respect to a balance point an improved toy and juvenile rest furniture apparatus is achieved.

The principle of extending the suspension point S1 to S2, in order to achieve a proper balance of the seat portion 30, further illustrates the necessity of having a uniformly curved stand and seat. If the metal tubular members were to be bent in a shape other than a general semi-circle, as earlier shown in FIG. 21, the gravity center line depicted by the line T and F could not be shifted forward without placing even greater and undue strain on the support members of the apparatus at already weakened bent regions.

It is to be understood that although the apparatus as shown and now to be described is convertible from a toy to an item of juvenile rest furniture, the tubular members of the support stand 29 and of the seat 30 could be made as longer members, rather than having separate add-on extensions 57, 58, and 59.

Referring now to FIGS. 23 and 24, there is shown a tubular extension member 57 and 57a which have an inside diameter slightly greater than the outside diameter of the ends of the tubular members 29a and 29b of the stand 29 which enables the extension members 57 and 57a to slip over the tubular members 29a and 29b. Prior to placing the extension members 57 and 57a over the stand members 29a and 29b, the bolt 40 is removed from the members 29a and 29b and the suspension bar 47. The extension members 57 and 57a then slide over a portion of the members 29a and 29b and holes 67 in the extension members 57 and 57a are positioned over the holes 40b for bolt 40 and bolt 40 is inserted through hole 62 and 40b, in the members 29a and 29b. The holes 61 and 63 in the extension members 57 and 57a correspond to holes 40c and 40d in the members 29a and 29b in which pins 55 and 56 are placed. The holes 61 and 63 are merely shown to correspond with holes 40c and 40d in order to accommodate two more bolts, such as bolt 40 if it be desired to further strengthen the fixing of the extensions 57 and 57a to the members 29a and 29b of the stand 29. A cap screw nut is then tightened on bolt 40 and the members 57a and 57 are rigidly secured to members 29a and 29b thus making an extension on the stand 29.

The extension members 64 and 64a for extending the seat 30 are also metal tubular members having their inside diameters correspond to the outside diameter of members 30a and 30b of the seat 30. The members 64 and 64a are fixedly secured to the members 30a and 30b by way of placing the bolt 42 in holes 65 and 42b in the same manner as just described for members 57 and 57a and 29a and 29f.

The suspension bar 41 may be inserted between the members 57 and 57a and 64 and 64a to provide the suspension means. However, a simplified suspension means, as seen in FIGS. 23 and 24 is provided. The simplified suspension means for converting the apparatus 28 from a toy to a juvenile furniture item is a conventional U-shaped bolt 66. U bolt 66 is inserted through holes 67, 68, 69, and 70, placed in the tubular extension members 57, 57a, 64 and 64a. At the lower threaded end portion 71 of the U bolt a metallic base plate 72 generally made from rectangular bar stock, is placed over the U bolt ends through appropriate holes in the base plate 72. Then cap screws 73 and 74 are tightened against the base plate 72 and the extension members 64 and 64a. The simplified arrangement of suspension just described provides a stationary or non-action suspension means as compared to the action or movable suspension means of the top.

Referring now to FIGS. 25, 26 and 27 there is shown a metal tubular extension member 75 formed in the shape of an elongated "U." The two ends of the extension member 75 slidably fit over the two ends of the tubular members 30a and 30b and of the seat portion 30 of the apparatus 28. The extension member 75 is then rigidly secured to the members 30a and 30b by removing and replacing the bolts 48 and 49 and the pins 51 and 52 in the seat 30 through appropriate holes 76, 77, 78, and 79 in the extension member 75.

A canvas cover 80 may be sewn around the tubular members of the extension 75 or fastened in any conventional manner to join with canvas material 50 of the seat 30 to form a continuous resting base of material from the seat portion 30 to the end of the extension member.

What is claimed is:

1. A swing comprising
   a tubular base member to rest on a supporting plane, such as a floor, and defining a support area;
   arcuate support means comprising two resilient tubular members to serve jointly as a substantially vertically support element and said two tubular members being of substantially semi-circular form and joined to provide a free top end and with their respective bottom ends shaped as tangentially extending portions secured to opposite sides of the tubular base member, said free top end being positioned vertically above said support area to serve as a single pivot point of support on a gravity line in the support area;
   and seat means consisting of tubular means shaped to have substantially a semi-circular form, between an upper end and a lower end, with a canvas panel supported therefrom to serve as a seat; and coupler means for supporting the top end of said seat means from said free top end of said arcuate support means for swinging, oscillating and revolving motion of said seat means.

2. A swing as in claim 1, in which
   said tubular base member has all of its elements effectively co-planar;
   and the free top end of said arcuate support means is substantially above the center of the area within said tubular base to establish a pivotal region of support for said arcuate seat means, the arcuate form of said two sections of said support means providing maximum availability of the inherent total resiliency of said arcuate support, free of stress-construction zones in said two sections.

3. A swing as in claim 2, in which
   the area outlined by the gravity line from the seat, in the maximum permitted motion of said seat means in swinging, oscillating and revolving, is always within the contour outline of said tubular base member, whereby the floor-supported swing is stable in all positions of the moving seat means.

4. A swing as in claim 1, in which
   said arcuate support means consists of said two individual members, each having a substantially semi-circular upper portion ending in a top free end, and each having a linear bottom portion substantially tangential to the bottom end of the semi-circular portion;
   anchor means anchoring each linear bottom portion of said support members to each one of the respective opposite side wall elements of the rectangular base; and
   means disposed on the two top free ends of said support members to mechanically couple those ends together to provide a single point of support for those coupled members.

5. A swing as in claim 1, in which
   said arcuate seat consists of two individual members, each having a substantially semi-circular upper portion ending in a top free end, both top ends being positioned in fixed top position and mechanically clamped, and said semi-circular members ending in spaced lower ends; and
   said canvas panel supported between said spaced lower ends to serve as a seat.

6. A swing as in claim 1, in which
   said arcuate seat consists of two individual members, each having a substantially semi-circular upper portion ending in a top free end, both top ends being positioned in fixed top position and mechanically clamped, and said semi-circular members ending in spaced lower ends;
   said canvas panel being supported between said spaced lower ends;
   a cross-bar extending between and bridging and coupling said spaced lower ends of said arcuate seat members to maintain predetermined spacing between said lower ends of said arcuate seat members;
   means provided between each end of said cross-bar and the end region of the adjacent seat member for mounting and supporting the cross-bar for pivotal movement from an upper position to a lower position first to permit easy direct insertion of a child onto said canvas panel seat, and then movement of the cross-bar back to upper position; and
   lock means on each end of said cross-bar to engage the adjacent end region of the related seat member for locking the cross-arm in upper position against casual or undesired displacement.

7. A swing as in claim 1, arranged to be collapsible, and in which
   said tubular frame base member consists of two longitudinal side wall elements of tubing and two transverse elements of end wall tubing, with means for coupling the side wall elements and the end wall elements into a rigid locked rectangular structure in one plane; and
   said arcuate support means consists of two tubular members each embodying a first portion of semi-circular form and a second portion of linear form extending tangentially from one end of said first portion of semi-circular form, with said tangential portions of linear form adapted to be firmly and rigidly coupled to said opposite side wall elements of said rectangular frame, with separable means for effecting such coupling, and with the upper free ends of said tubular members adapted to be mechanically closely coupled together as an upper end; and
   said arcuate seat means consists of two tubular members, each shaped to be of substantially semi-circular form, with said canvas panel mounted on the two tubular members, to serve as a seat, with a separable cross-bar adapted to be coupled to the lower ends of said two members to hold said ends spaced to spread said canvas panel as a seat, and with other separable means adapted to mechanically couple the upper ends of said two tubular members together; and
   suspension means for separably coupling said upper ends of said two tubular seat members to said upper coupled ends of said tubular support members;
   whereby said tubular members may be separated and compactly packaged for handling and shipment.

8. A swing as in claim 1, in which
   said arcuate seat means embodies two tubular side members, each such member being formed to have an intermediate portion of substantially semi-circular shape and having a short tangential upper extension at one end of said intermediate portion that is to serve as the top end for suspension support, and said intermediate arcuate portion having also a tangential lower extension at the other or lower end, to serve with the corresponding lower extension of the other side member as cooperating side supporting means for a panel of fabric, or the like, adequate in strength and length to support a human body in prone position, and the upper tangential extension being of sufficient length beyond the arcuate portion to provide a point of support from which the gravity line will pass through a small area that will include and be intersected by a gravity line from the center of gravity of the swing seat and a body on said seat.

9. A swing as in claim 1, including, additionally, extension means for the upper end of said tubular means of said seat means, including means on seat extension means for receiving said coupling means; and extension means for the lower end of said tubular seat means; and means serving as an extension or substitute for said canvas panel to provide support for a human body in prone position.

10. A swing, as in claim 9, in which said extension means, for the upper and lower ends of said seat means, consist of tubular elements fitting into said tubular seat means.

References Cited
UNITED STATES PATENTS

| | | | |
|---|---|---|---|
| 159,451 | 7/1850 | Smith | 272—55 X |
| 364,592 | 5/1887 | Jones | 297—274 X |
| 3,078,092 | 2/1963 | Mills | 272—55 |
| 2,545,295 | 3/1951 | Miller | 272—85 |

FOREIGN PATENTS

| | | |
|---|---|---|
| 75,741 | 10/1949 | Norway. |
| 677,707 | 1/1964 | Canada. |

ANTON O. OECHSLE, Primary Examiner

T. BROWN, Assistant Examiner

U.S. Cl. X.R.

297—277

UNITED STATES PATENT OFFICE
CERTIFICATE OF CORRECTION

Patent No. 3,528,657                      September 15, 1970

Michael R. Krupsky

It is certified that error appears in the above identified patent and that said Letters Patent are hereby corrected as shown below:

In the heading to the printed specification, line 6, "Saul Berry" should read -- Saul Berr --.

Signed and sealed this 2nd day of March 1971.

(SEAL)
Attest:

Edward M. Fletcher, Jr.            WILLIAM E. SCHUYLER, JR.
Attesting Officer                      Commissioner of Patents